United States Patent [19]
Petrunka

[11] Patent Number: 6,018,579
[45] Date of Patent: Jan. 25, 2000

[54] CALL CENTER SERVICES FOR LOCAL CALLS USING LOCAL NUMBER PORTABILITY

[75] Inventor: Robert W. Petrunka, Raleigh, N.C.

[73] Assignee: Nortel Networks Corporation, Canada

[21] Appl. No.: 08/982,501

[22] Filed: Dec. 2, 1997

Related U.S. Application Data

[63] Continuation-in-part of application No. 08/760,111, Dec. 3, 1996.

[51] Int. Cl.$^7$ .................................................. H04M 3/42
[52] U.S. Cl. ........................ 379/265; 379/207; 379/211; 379/220
[58] Field of Search ................................. 379/265, 266, 379/219, 220, 221, 207, 210, 211

[56] References Cited

U.S. PATENT DOCUMENTS

| | | | |
|---|---|---|---|
| 4,048,452 | 9/1977 | Oehring et al. ............................ | 179/27 |
| 4,289,934 | 9/1981 | Pitroda et al. ............................. | 179/27 |
| 4,466,098 | 8/1984 | Southard .................................... | 371/9 |
| 4,674,036 | 6/1987 | Conforti ................................... | 364/200 |
| 4,700,381 | 10/1987 | Eher ........................................ | 379/279 |
| 4,737,983 | 4/1988 | Frauenthal et al. ...................... | 379/221 |
| 4,755,995 | 7/1988 | Anderson et al. .......................... | 371/9 |
| 4,866,763 | 9/1989 | Cooper et al. ............................ | 379/221 |
| 4,881,261 | 11/1989 | Oliphant et al. .......................... | 379/215 |
| 4,893,301 | 1/1990 | Andrews et al. ...................... | 370/58.2 |
| 4,951,310 | 8/1990 | Honda et al. ............................. | 379/266 |
| 4,988,209 | 1/1991 | Davidson et al. ...................... | 370/58.2 |
| 5,023,868 | 6/1991 | Davidson et al. ........................ | 370/62 |
| 5,031,211 | 7/1991 | Nagai et al. ............................. | 379/221 |
| 5,036,535 | 7/1991 | Gechter et al. .......................... | 379/210 |

(List continued on next page.)

FOREIGN PATENT DOCUMENTS

| | | |
|---|---|---|
| 0 424 015 A2 | 4/1991 | European Pat. Off. . |
| 0 539 104 A2 | 4/1993 | European Pat. Off. . |
| 0 545 266A | 6/1993 | European Pat. Off. . |
| WO 94/00945A | 1/1994 | European Pat. Off. . |
| 0 647 051 A1 | 9/1994 | European Pat. Off. . |
| 0 622 938 A2 | 11/1994 | European Pat. Off. . |
| 0 710 042 A2 | 5/1996 | European Pat. Off. . |
| 0 753 956A | 1/1997 | European Pat. Off. . |
| 0 802 665 A2 | 10/1997 | European Pat. Off. . |
| WO 98/01987 | 1/1998 | European Pat. Off. . |
| 2 298 761 | 9/1996 | United Kingdom . |

OTHER PUBLICATIONS

Giordano et al., "PCS Number Portability", IEEE/ICCC, pp. 1146–1150, 1994.

Japanese Patent Abstract Publication No. 07170288, dated Jul.4, 1995.

Harvey, D.E. et al., "Call Center Solutions," AT&T Technical Journal, vol. 70, No. 5, Sep. 1, 1991, pp. 36–44.

*Primary Examiner*—Scott Wolinsky
*Attorney, Agent, or Firm*—Finnegan, Henderson, Farabow, Garrett & Dunner, L.L.P.

[57] ABSTRACT

A call servicing system permits agents to service customer calls dialed with a local telephone number. The system includes a network call center that connects a plurality of agent switches to a plurality of customer switches. The agent switches direct calls to and from service agents, and the customer switches direct calls to and from customers. The system further includes a database connected to at least one of the customer switches. The database stores forwarding information corresponding to local telephone numbers dialed by the customers. When a customer switch receives a call requesting service from one of the customers dialing a local telephone number, the switch queries the database, using the local telephone number, to retrieve forwarding information corresponding to the local telephone number, and routes the call to the network call center using the forwarding information. The network call center queues the call, and transmits it to one of the service agents via one of the agent switches.

29 Claims, 6 Drawing Sheets

U.S. PATENT DOCUMENTS

| | | | |
|---|---|---|---|
| 5,062,103 | 10/1991 | Davidson et al. | 370/58.1 |
| 5,073,890 | 12/1991 | Danielsen | 370/58.2 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,193,110 | 3/1993 | Jones et al. | 379/94 |
| 5,214,688 | 5/1993 | Szlam et al. | 379/67 |
| 5,271,058 | 12/1993 | Andrews et al. | 379/210 |
| 5,291,492 | 3/1994 | Andrews et al. | 370/110.1 |
| 5,291,550 | 3/1994 | Levy et al. | 379/242 |
| 5,291,551 | 3/1994 | Conn et al. | 379/265 |
| 5,309,505 | 5/1994 | Szlam et al. | 379/88 |
| 5,309,513 | 5/1994 | Rose | 379/265 |
| 5,317,627 | 5/1994 | Richardson, Jr. et al. | 379/88 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/85.4 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93 |
| 5,404,350 | 4/1995 | DeVito et al. | 370/16 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,526,353 | 6/1996 | Henley et al. | 370/60.1 |
| 5,546,452 | 8/1996 | Andrews et al. | 379/219 |
| 5,625,681 | 4/1997 | Bultler, II | 379/207 |
| 5,633,924 | 5/1997 | Kaish et al. | 379/265 |
| 5,646,987 | 7/1997 | Gerber et al. | 379/265 |
| 5,661,792 | 8/1997 | Akinpelu et al. | 379/221 |
| 5,684,872 | 11/1997 | Flockhart et al. | 379/265 |
| 5,729,600 | 3/1998 | Blaha et al. | 379/265 |
| 5,754,639 | 5/1998 | Flockhart et al. | 379/265 |
| 5,778,060 | 7/1998 | Otto | 379/265 |
| 5,883,950 | 3/1999 | Sonnenberg | 379/220 |

CALL CENTER SERVICES FOR LOCAL CALLS USING LOCAL NUMBER PORTABILITY

RELATED APPLICATIONS

This application is a continuation-in-part of U.S. patent application Ser. No. 08/760,111, filed Dec. 3, 1996, and related to U.S. patent application Ser. Nos. 08/833,990 and 08/833,997, both filed Apr. 11, 1997, and U.S. patent application Ser. No. 08/982,471, filed concurrently herewith, all of which are incorporated by reference.

BACKGROUND OF THE INVENTION

The present invention is directed to a network call center that provides customers, using a local telephone number, access to large virtual agent teams while reducing terminating facilities.

Many businesses use agents or operators to service customers by telephone. These businesses often employ several agents connected to an Automatic Call Distribution (ACD) system, such as a Meridian® ACD manufactured by Northern Telecom, Ltd., to handle multiple calls simultaneously. The call center technology distributes the calls, usually dialed with an toll-free number, to the agents.

There are three principal types of call center technology: standalone ACDs, ACDs integrated with a Private Branch Exchange (PBX), and central office based ACDs. The most commonly used type is the ACD integrated with a PBX.

Some conventional call center owners provide call center services through multiple local branches. Each local branch connects to an ACD to service customers in their respective service areas. To contact one of the local branches, customers dial a local telephone number.

Other conventional call center owners permit remote (non-local) agents to service customer calls. Customers typically access these call centers using a toll-free telephone number.

To accomplish remote agent servicing, the local ACD switch, to which the local agents connect, determines the status of the local agents. If all of the local agents are busy when a customer call arrives, the local ACD switch determines whether to queue the call until an agent becomes available or to forward the call to a remote ACD switch for servicing. This determination is normally preestablished by the call center owner.

If the call is to be forwarded, the local ACD switch determines a network identifier for the remote ACD switch from a database and forwards the customer call using the network identifier. At the remote ACD switch, the call is queued or routed to an available agent for servicing.

The conventional call center described above causes unnecessary delays in the servicing of customer calls due to the determinations that must be made by the local ACD switch as to whether a particular customer call is to be forwarded and the identity of a remote ACD switch that will handle the customer call. Also, because queued calls can only be serviced by those agents of the agent team that connect to the ACD queuing the call, additional expense and network resources are required to forward the calls from the queuing ACD to one that is less busy. This forwarding of calls increases the average wait time before an agent services a customer's call, and requires additional terminating facilities.

Therefore, a need exists to provide customers with more timely access to agents while reducing agent staffing requirements and terminating facilities.

SUMMARY OF THE INVENTION

Systems and methods consistent with the principles of the present invention address this need by permitting customers that dial a local telephone number access to a virtual agent team that may be physically located almost anywhere, and by reducing terminating facilities by queuing customer calls at a higher level in the network than conventional systems, and by providing connection into the local network only when an agent becomes available to service the call.

In accordance with the purpose of the invention as embodied and broadly described herein, a system consistent with the principles of the present invention comprises a network call center that connects a plurality of agent switches to a plurality of customer switches. The agent switches direct calls to and from service agents, and the customer switches direct calls to and from customers. The system further includes a database connected to at least one of the customer switches. The database stores forwarding information corresponding to local telephone numbers dialed by the customers.

When a customer switch receives a call requesting service from one of the customers dialing a local telephone number, the switch queries the database, using the local telephone number, to retrieve forwarding information corresponding to the local telephone number, and routes the call to the network call center using the forwarding information. The network call center queues the call, and transmits it to an available service agent via one of the agent switches.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention permit customers to dial a local telephone number and receive timely access from service agents by routing the customer calls to any agent of a virtual team of agents whose physical location is immaterial, and reduce terminating facilities by queuing customer calls at a higher level in the network and routing a customer call to the local network only when an agent becomes available to service the call.

The systems and methods consistent with the principles of the present invention utilize Local Number Portability (LNP) to accomplish these objectives. LNP is mandated by the Federal Communications Commission in order to satisfy the requirements of the Telecom Act of 1996. The use of LNP permits competition in the local telephone market. LNP allows a party to change telephone service providers without changing telephone numbers.

With LNP, when a call is made to a telephone number that is in a zone of portability, determined by the first six digits of the called telephone number (known as the area code and office code, or simply NPA-NXX), a local switch queries an LNP Service Control Point (SCP). The LNP SCP accesses internal databases and returns a Local Routing Number (LRN) and the originally dialed telephone number to the local switch. The local switch routes the call to a terminating switch of the new service provider using the LRN. The terminating switch uses the originally dialed telephone number to route the call to the intended party.

I. Network Elements

Figure 1:
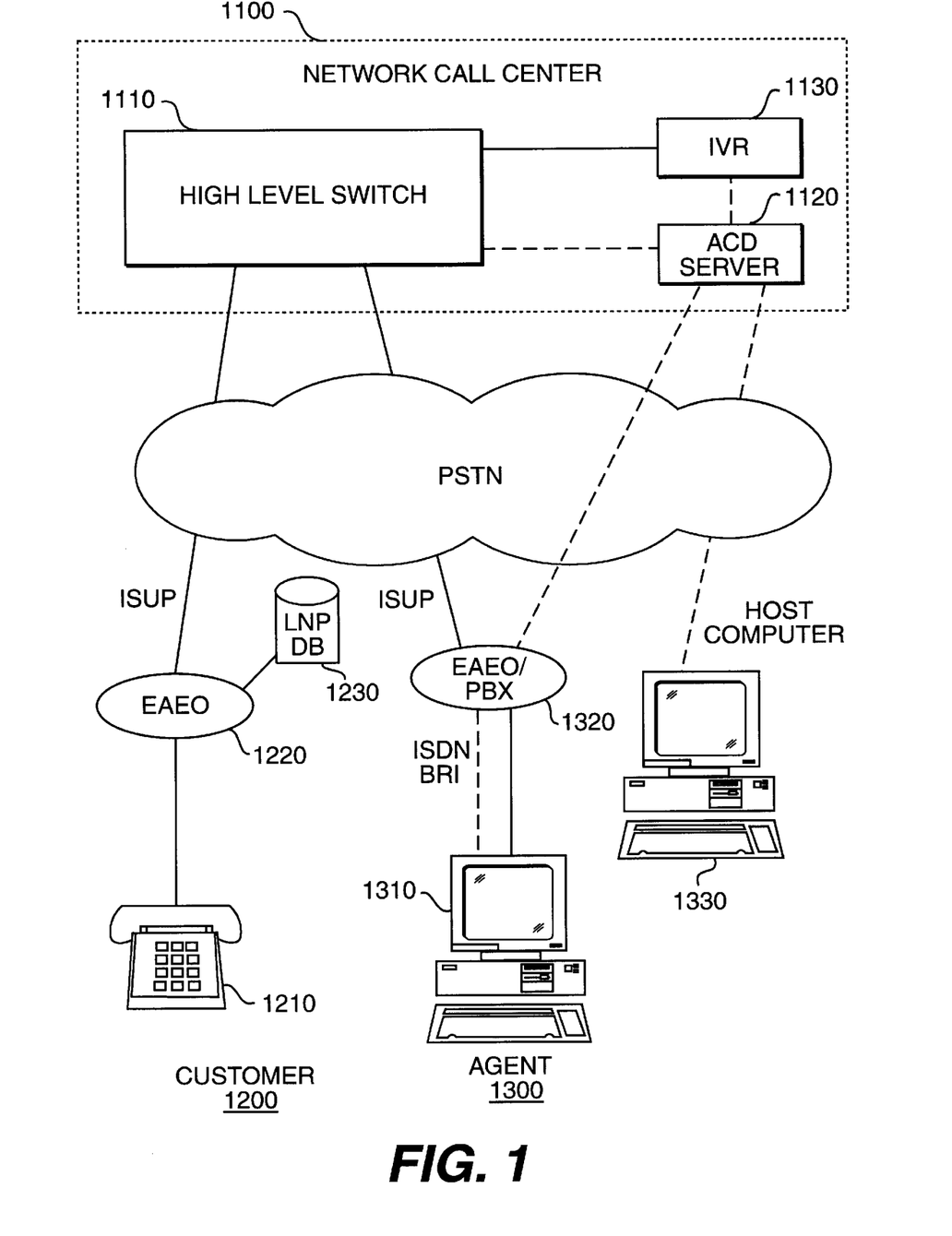
FIG. 1 is a diagram of a communications network consistent with the principles of the present invention.

FIG. 1 is a diagram of a communications network consistent with the principles of the present invention. Network Call Center (NCC) 1100 connects customer 1200 to an agent of a virtual team of agents, including agent 1300, using the public network, such as the Public Switched Telephone Network (PSTN). A single customer and a single agent have been shown for simplicity. The present invention does not require any specific number of customers and agents, but encompasses any number of customers and agents connected anywhere in the network.

Customer 1200 uses a conventional telephone 1210 to communicate with an agent of the virtual agent team through NCC 1100. Equal Access End Office (EAEO) 1220 connects customer 1200 to NCC 1100 over a standard ISUP trunk, such as a GR394 ISUP trunk. EAEO 1220 also connects to LNP database 1230. LNP database 1230 stores tables that relate LRNs to telephone numbers in a zone of portability. The zone of portability includes telephone numbers that are to be routed through the PSTN using an LRN instead of the called telephone number. The zone of portability and the LRNs included in LNP database 1230 are established by the operating telephone company on behalf of the call center provider.

Several types of connections exist for connecting an agent of the virtual agent team to NCC 1100: (1) via a local switch having no ACD functionality; (2) via a local switch having ACD functionality; and (3) via a data network connection, such as the Internet. No one type of connection is preferred over the others. Each type of connection has its advantages. Business considerations and the physical locations of the agents play a role in making the decision as to which type of connection is best.

The communications network shown in FIG. 1 utilizes the first type of connection to connect agent 1300 to NCC 1100. The second type of connection is described in copending application, Ser. No. 08/760,111, and the third type of connection is described in copending application, Ser. No. 08/982,471.

Agent 1300 uses agent terminal 1310 to connect to local EAEO/PBX switch 1320, a standard class 5 switch without ACD functionality. Agent terminal 1310 connects to EAEO/PBX 1320 using a voice channel and a data channel, and connects to host computer 1330 using a data channel. The data and voice channels may take many forms. For example, FIG. 1 shows agent 1300 connected to EAEO/PBX 1320 using a standard ISDN Basic Rate Interface (BRI) connection.

ISDN BRI provides two bearer (B) channels and one data (D) channel. The first B channel provides a voice connection to customer 1200 through NCC 1100. The second B channel provides other functions, such as setting up a data connection to host computer 1330 to obtain information regarding customer 1200 based on the calling telephone number. Alternatively, agent terminal 1310 may use the second B channel to access service data, such as a reservations database, using a conventional database access technique.

The D channel provides an X.25 data packet connection, for example, to NCC 1100 to inform NCC 1100 regarding agent availability. EAEO/PBX 1320 establishes the X.25 data packet connection with NCC 1100 through a public packet switching network. This data connection could alternatively be established by connection to an external data communication server which, in turn, relays the X.25 data packet to NCC 1100.

Other mechanisms for providing the connection to agent 1300 include a single telephone line, dual telephone lines, and coaxial television cable. Agent 1300 may use a single telephone line to establish both the data and voice connections. The connection using a single telephone line is described in copending application, Ser. No. 08/833,990.

Agent 1300 may use dual telephone lines to establish the data and voice connections. A first telephone line provides a voice connection to customer 1200 through NCC 1100. The second telephone line provides a data connection to a data server (not shown). The data server, in turn, relays the data messages to NCC 1100 over private facilities using data communications technology, such as Ethernet. The data server also establishes a data connect ion with host computer 1330.

Alternatively, a coaxial television cable may be modified to provide the connection to agent 1300. In this case, the coaxial cable includes a voice channel to establish a voice connection to customer 1200 through NCC 1100. The same coaxial cable also provides data connections to NCC 1100 and host computer 1330.

With agent 1300 connected as shown in FIG. 1, EAEO/PBX 1320 connects agent terminal 1310 to NCC 1100 using a standard ISUP trunk over the PSTN and a data connection, such as an Ethernet-equivalent or X.25 data connection. Agent terminal 1310 also connects to host computer 1330 via a data connection, such as an Ethernet-equivalent or X.25 data connection. Similar to the conventional systems, host computer 1330 contains information regarding the customer based on the calling telephone number.

Host computer 1330 preferably contains a data connection, such as an Ethernet-equivalent or X.25 data connection, to NCC 1100 to provide NCC 1100 with customer information. Host computer 1330 might alternatively have no data connection to NCC 1100, in which case host computer 1330 sends the customer information to agent terminal 1310 in response to an agent request.

NCC 1100, consistent with the principles of the present invention, includes High Level Switch (HLS) 1110, ACD server 1120, and Interactive Voice Response unit (IVR) 1130. HLS 1110 is a network switch, such as a DMS Traffic Operator Position System (TOPS) switch manufactured by Northern Telecom, Ltd. HLS 1110 routes calls from customer 1200 to an agent of a virtual team of agents, including agent 1300. HLS 1110 preferably contains an interface that permits ACD server 1120 to control the routing of calls.

ACD server 1120 includes a computer with an Ethernet-equivalent data connection to HLS 1110 and IVR 1130. ACD server 1120 preferably comprises an IBM, or IBM compatible, computer executing Windows NT™, but might alternatively comprise a UNTX™-capable computer, such as an HP model or the IBM Risc 6000.

ACD server 1120 queues customer calls, records information regarding the availability of agents, controls the routing of calls by HLS 1110 and the operation of IVR 1130, and provides Management Information System (MIS) data. ACD server 1120 also processes network events reported by HLS 1110, and takes appropriate action, such as rerouting of calls and releasing of called trunks due to busy conditions, for example.

Figure 2:
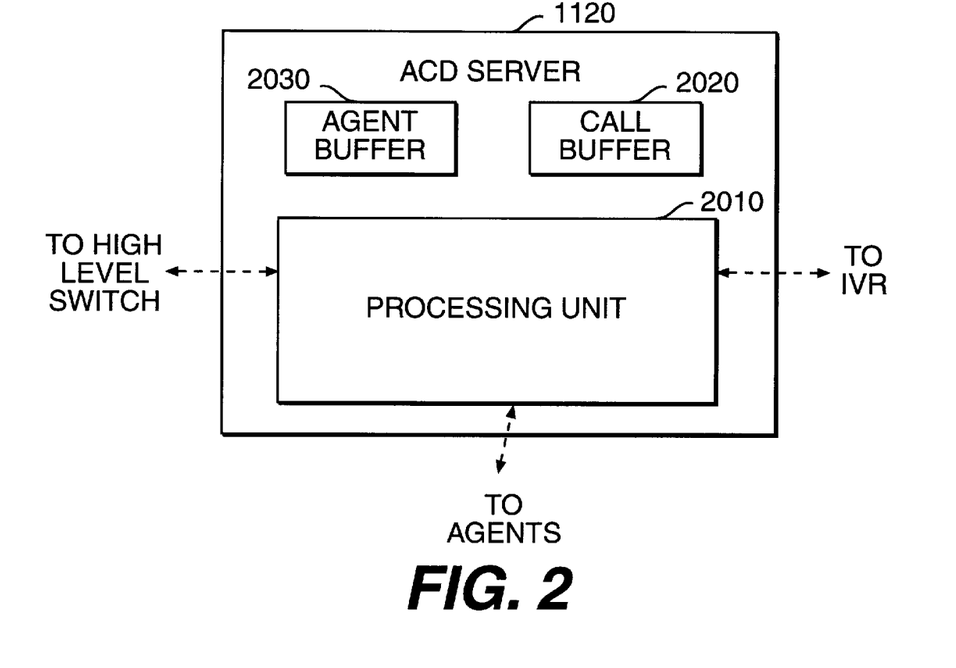
FIG. 2 is a block diagram of the components of the ACD server of FIG. 1.

FIG. 2 is a block diagram of the components of ACD server 1120, including processing unit 2010, call buffer 2020, and agent buffer 2030. Processing unit 2010 tracks agent availability and handles the processing of customer calls, including the queuing of such calls in call buffer 2020 and the routing of these calls to available agents.

Call buffer 2020 includes several call queues arranged by specific categories, such as by agent team, or by specific customer call criteria, such as the desired language of the customer. The call queues may also contain priority call queues for faster service by the agents. A call may be placed in a priority call queue, after it has waited in call buffer 2020 longer than a predetermined period of time.

Agent buffer 2030 contains several agent queues arranged, for example, by agent team. Each agent queue contains values representing idle agents waiting for a call to service. Similar to the call queues, the agent queues may contain priority agent queues that are searched first when a new call arrives needing service.

The particular queues within call buffer 2020 that an agent services and the queues within agent buffer 2030 of available agents are predetermined by the call center service provider or by the operating telephone company on behalf of the call center service provider. Agents may need to service multiple queues or just one queue. Agents may also need to service different queues at different priorities.

Returning to FIG. 1, IVR 1130 includes a computer, such as a personal computer or a larger mainframe computer, with a voice connection to HLS 1110. IVR 1130 collects information from the customers to aid ACD server 1120 in categorizing the customer calls, storing them in a proper call queue in ACD server 1120, and directing them to an appropriate agent. IVR 1130 also plays announcements or music for the customers while awaiting service in a call queue.

II. Processing

Figure 3:
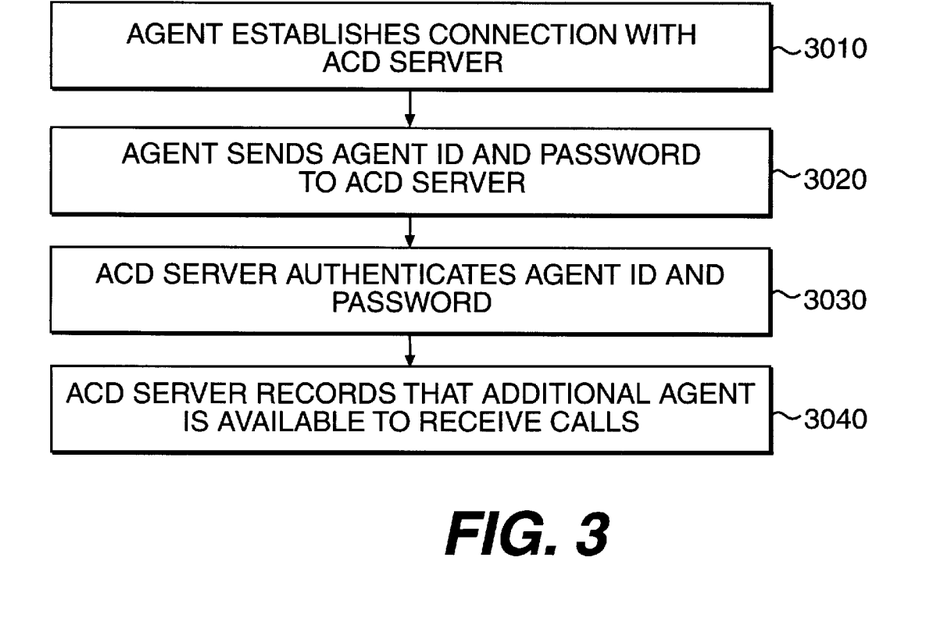
FIG. 3 is a flowchart of agent log-on activity consistent with the principles of the present invention.

FIGS. 3–6 are flowcharts illustrating call servicing activity consistent with the principles of the present invention. FIG. 3 is a flowchart of agent log-on activity consistent with the principles of the present invention. The agent log-on activity occurs when an agent, such as agent 1300 in FIG. 1, wants to service customer calls. Agent 1300 establishes a connection with ACD server 1120 by turning on agent terminal 1310 and setting up an X.25 data packet connection to ACD server 1120 via EAEO/PBX 1320 by conventional methods [step 3010].

After establishing the connection, agent 1300 sends ACD server 1120 an X.25 log-on message, including an authorized agent identification number (ID) and password [step 3020]. ACD server 1120 verifies the agent ID and password to ensure that only authorized agents are permitted to log in [step 3030]. Based on the agent identifier, ACD server 1120 updates internal records indicating that an additional agent is available to service customer calls, the skills agent 1300 has, and the queues agent 1300 can serve [step 3040].

Figure 4A:
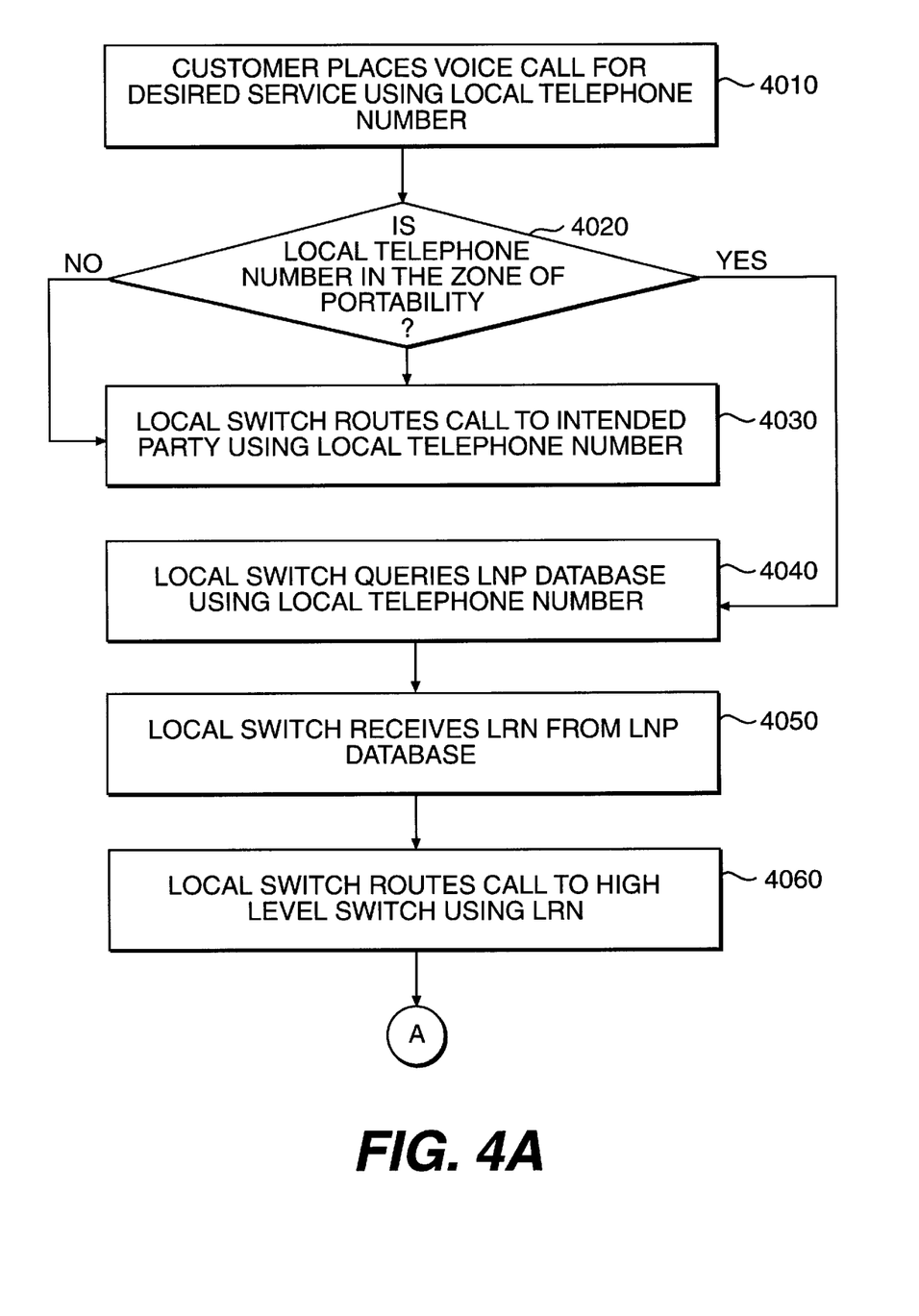
FIGS. 4A and 4B are flowcharts of call flow activity consistent with the principles of the present invention.
Figure 4B:
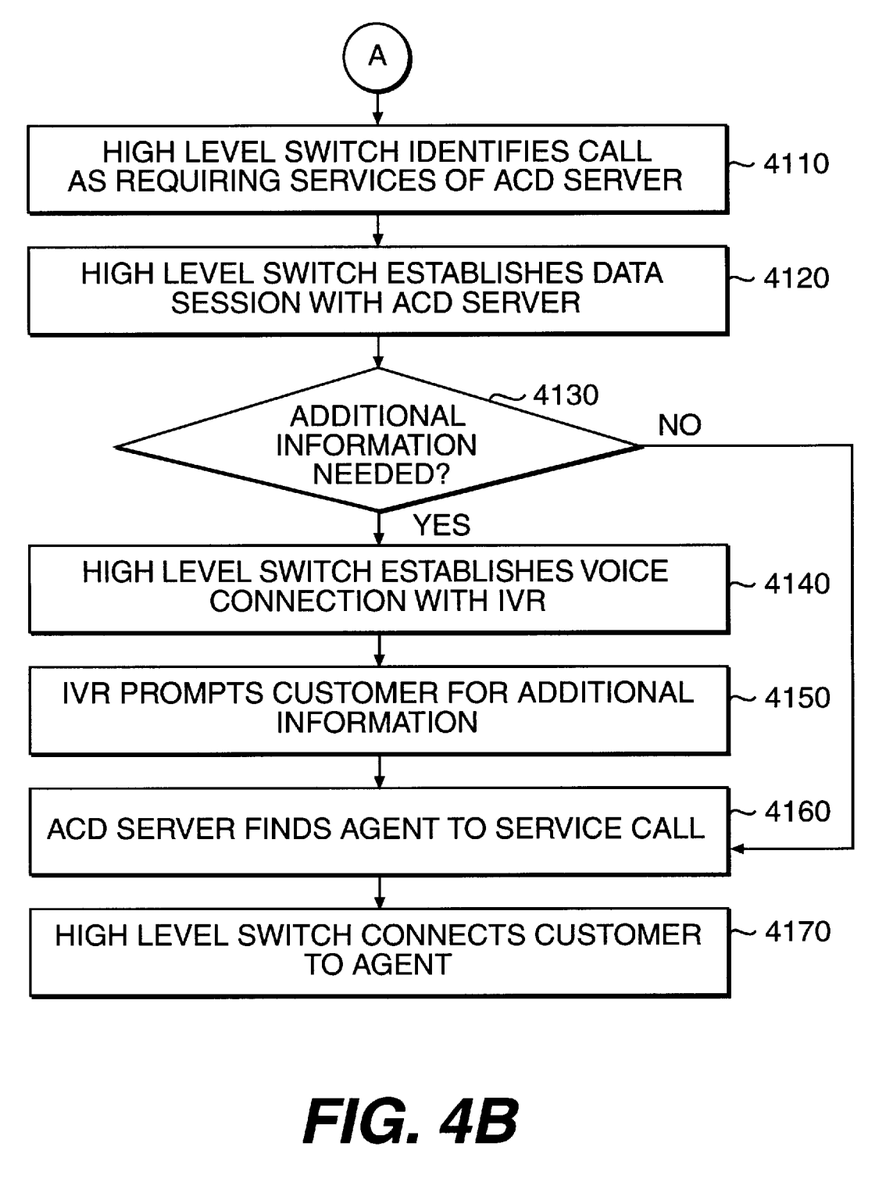

Once agent 1300 successfully logs in, agent 1300 awaits a customer call. FIGS. 4A and 4B are flowcharts of call flow activity consistent with the principles of the present invention. A customer, such as customer 1200, places a voice call for a desired service, such as to make a reservation or to order a product [step 4010] (FIG. 4A). To place the voice call, customer 1200 dials a local telephone number for the desired service.

EAEO 1220 receives customer 1200's call and determines whether the local telephone number dialed by customer 1200 is in a zone of portability [step 4020]. EAEO 1220 might make this determination by comparing the first six digits of the local telephone number (i.e., NPA-NXX) to an internal database of numbers falling within the zone of portability.

If EAEO 1220 determines that the local telephone number does not fall within the zone of portability, EAEO 1220 routes the call to a local terminating switch using the local telephone number [step 4030]. If EAEO 1220 determines that the local telephone number does fall within the zone of portability, however, EAEO 1220 queries LNP database 1230 using the local telephone number [step 4040].

LNP database 1230 accesses internal tables to obtain an LRN corresponding to the local telephone number, and supplies this LRN to EAEO 1220 [step 4050]. In an implementation consistent with the principles of the present invention, the LRN is a network identifier identifying HLS 1110. Using the LRN, EAEO 1220 routes customer 1200's call to HLS 1110 through the PSTN [step 4060]. Along with the call, EAEO 1220 transmits the local telephone number dialed by customer 1200 in a parameter known as a Generic Address Parameter (GAP).

HLS 1110 receives the call and, upon detecting the LRN, identifies it as a call requiring the services of ACD server 1120 [step 4110] (FIG. 4B). HLS 1110 then establishes a data session with ACD server 1120 [step 4120] and sends ACD server 1120 call information, including the calling telephone number and the called telephone number, retrieved from the GAP parameter. At this point, ACD server 1120 may desire to collect additional information from customer 1200 [step 4130]. The criteria for collecting additional information is preferably preestablished. ACD server 1120 might always desire to collect additional information or might desire to collect additional information only from customers who have not previously called for the particular service.

If ACD server 1120 desires additional information from customer 1200, ACD server 1120 directs HLS 1110 to establish a voice connection to IVR 1130 [step 4140]. Once HLS 1110 connects customer 1200's call to IVR 1130, ACD server 1120 instructs IVR 1130 to prompt customer 1200 for the desired information [step 4150]. Using this information, ACD server 1120 finds from the agent queues the next available agent who has the necessary skills to service customer 1200 [step 4160]. Once ACD server 1120 finds the appropriate agent, for our example, agent 1300, ACD server 1120 instructs HLS 1110 to connect customer 1200 to agent 1300 through the PSTN [step 4170]. To route the call to agent 1300, HLS 1110 may use a directory number (DN) corresponding to the telephone number dialed by customer 1200 or may alternatively use a different DN, assigned specifically to agent 1300.

If ACD server 1120 does not need additional information from customer 1200 [step 4130], ACD server 1120 finds from the agent queues the next available agent, again agent 1300, who has the necessary skills to service customer 1200, given the information ACD server 1120 has regarding customer 1200 [step 4160]. Once ACD server 1120 finds agent 1300, ACD server 1120 instructs HLS 1110 to connect customer 1200's call to agent 1300 through the PSTN [step 4170].

Figure 5:
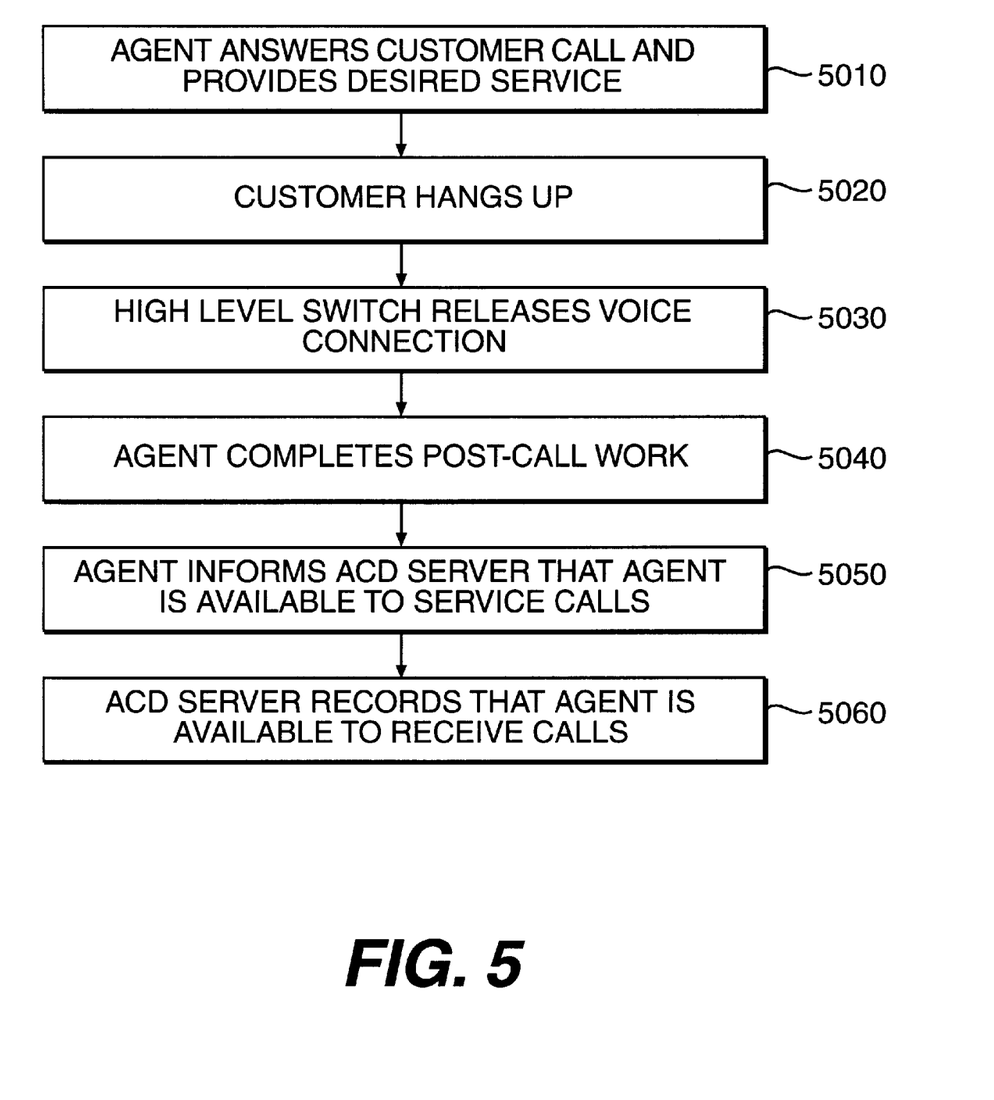
FIG. 5 is a flowchart of agent service activity consistent with the principles of the present invention.

When agent 1300 receives customer 1200's call, agent 1300 services the call. FIG. 5 is a flowchart of agent service activity consistent with the principles of the present invention. Agent 1300 answers customer 1200's call and provides the desired service [step 5010]. At the end of the call, customer 1200 places customer telephone 1210 on-hook, thereby hanging up [step 5020]. In response, HLS 1110 releases the voice connection between customer 1200 and agent 1300 [step 5030].

Once HLS 1110 releases the voice connection, agent 1300 completes any post-call work [step 5040], and then sends ACD server 1120 an X.25 message indicating availability to service another call [step 5050]. ACD server 1120 updates its records accordingly [step 5060].

Figure 6:
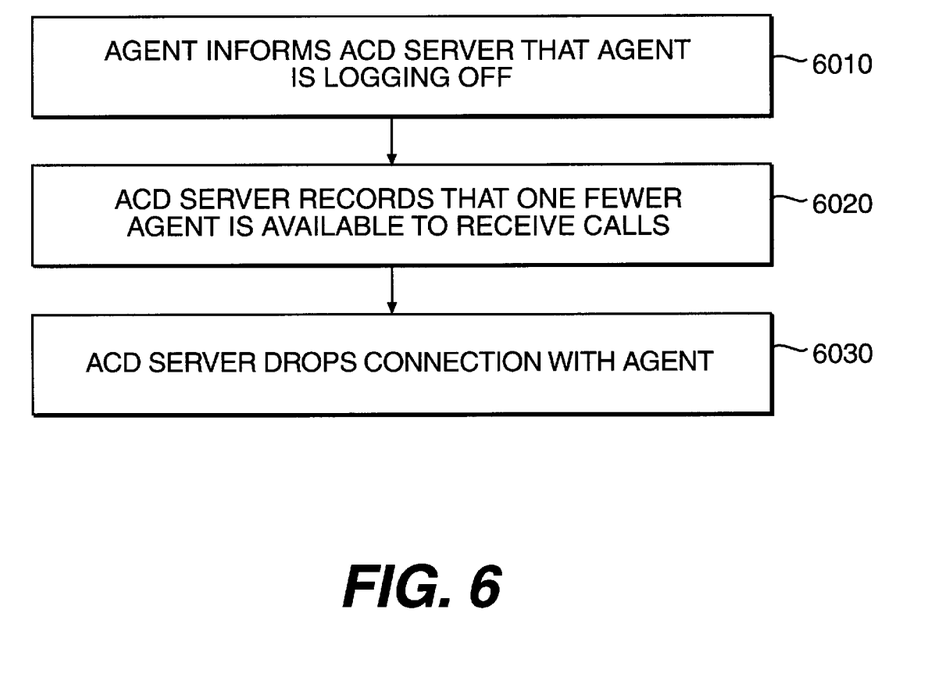
FIG. 6 is a flowchart of agent log-off activity consistent with the principles of the present invention.

At some point, agent 1300 may want to discontinue servicing customer calls. FIG. 6 is a flowchart of agent log-off activity consistent with the principles of the present invention.

Agent 1300 sends an X.25 log-off message to ACD server 1120 to indicate agent 1300's desire to log off of the system [step 6010]. Upon receiving the log-off message, ACD server 1120 records that one fewer agent is available to service calls [step 6020]. ACD server 1120 then drops its connection with agent 1300 [step 6030], logging agent 1300 off of the system.

III. Conclusion

The systems and methods consistent with the principles of the present invention utilize local number portability to permit local telephone companies to provide enhanced call center services for call center service providers whose customers reach them by making local telephone calls.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

While a network level switch has been described as providing the call management functionality, this need not be the case. The call management functionality might alternatively be provided by a local switch. Furthermore, the ACD server has been described as containing the customer and agent queues. However, the high level switch might alternatively provide this queuing.

In addition, while the customer switch has been described as querying the LNP database only when the telephone number dialed by a customer falls within a zone of portability, this need not be the case. The zone of portability is a transitional concept. The customer switch may access the LNP database for each telephone number dialed by the customers.

What is claimed is:

1. A call servicing system comprising:
   a plurality of agent switches configured to direct calls to and from service agents;
   a database configured to store forwarding information corresponding to local telephone numbers dialed by customers;
   a plurality of customer switches configured to direct calls to and from the customers, at least one of the customer switches being connected to the database and including
   means for receiving a call requesting service from one of the customers dialing a local telephone number,
   means for querying the database using the local telephone number to retrieve the forwarding information corresponding to the local telephone number, and
   means for routing the call along with the local telephone number and the forwarding information; and
   a network call center, connected to the agent switches and the customer switches, configured to receive the call routed using the forwarding information, to queue the call, and to transmit the call to one of the service agents via one of the agent switches.

2. The call servicing system of claim 1, wherein the database stores forwarding information for only predetermined local telephone numbers; and
   wherein the one customer switch further includes
   means for determining whether the local telephone number is one of the predetermined local telephone numbers.

3. The call servicing system of claim 2, wherein the querying means includes
   means for querying the database only when the local telephone number is one of the predetermined local telephone numbers.

4. The call servicing system of claim 1, wherein the database is a local number portability database storing local routing numbers corresponding to the local telephone numbers; and
   wherein the querying means includes
   means for retrieving the local routing number corresponding to the local telephone number.

5. The call servicing system of claim 4, wherein the local routing numbers include NPA-NXX codes.

6. The call servicing system of claim 1, wherein the network call center includes
   means for determining whether the one service agent is available to service the call, and
   means for transmitting the call only when the one service agent is available.

7. The call servicing system of claim 1, wherein the network call center includes
   an interactive voice response unit configured to query the customer for information regarding the call, and to play a recording for the customer while the call is queued.

8. The call servicing system of claim 1, wherein the network call center includes
   a network switch, connected to the customer switches and the agent switches, configured to receive the calls from the customers and to route the calls to the service agents via the agent switches, and
   an Automatic Call Distribution (ACD) server, connected to the network switch and the agent switches, configured to queue the calls, to track status of the service agents, and to control the network switch to route the calls to appropriate ones of the service agents via the agent switches.

9. The call servicing system of claim 8, wherein the ACD server includes
   an agent buffer including a plurality of agent queues for storing values corresponding to available ones of the service agents, and
   processing means for storing the values in the agent queues.

10. The call servicing system of claim 9, wherein the ACD server further includes a call buffer including a plurality of call queues for storing calls awaiting service, the processing means stores the waiting calls in the call queues.

11. The call servicing system of claim 10, wherein the call queues are arranged by predetermined categories; and
wherein the processing means includes
means for categorizing the calls according to the predetermined categories, and
means for storing each of the categorized calls in a corresponding one of the call queues.

12. A method for servicing customer calls in a communications network including a network call center coupled to a plurality of agent and customer switches, at least one of the customer switches being connected to a database that stores forwarding information corresponding to local telephone numbers dialed by customers, the method comprising the steps of:
receiving a customer call at the one customer switch from a customer dialing a local telephone number;
accessing the database using the local telephone number to retrieve the forwarding information corresponding to the local telephone number;
routing the customer call to the network call center along with the local telephone number and the forwarding information;
queuing the customer call at the network call center; and
transmitting the customer call to one of the service agents via one of the agent switches.

13. The method of claim 12, wherein the database stores forwarding information for only predetermined local telephone numbers; and
wherein the receiving step includes the substep of
determining whether the local telephone number is one of the predetermined local telephone numbers.

14. The method of claim 13, wherein the accessing step includes the substep of
accessing the database only when the local telephone number is one of the predetermined local telephone numbers.

15. The method of claim 12, wherein the database is a local number portability database storing local routing numbers corresponding to the local telephone numbers; and
wherein the accessing step includes the substep of
retrieving the local routing number corresponding to the local telephone number.

16. The method of claim 12, wherein the network call center includes a network switch and an Automatic Call Distribution (ACD) server; and
wherein the method further includes the steps of
receiving the customer call at the network switch,
detecting call information from the customer call by the network switch, and
sending the call information to the ACD server.

17. The method of claim 16, wherein the queuing step includes the substeps of
determining that the one service agent is available to service customer calls in the ACD server, and
instructing the network switch to route the customer call to the available one service agent via the one agent switch.

18. The method of claim 12, wherein the transmitting step includes the substeps of
determining whether the one service agent is available to service the customer call, and
transmitting the customer call to the one service agent only when the one service agent is determined to be available.

19. The method of claim 12, wherein the queuing step includes the substeps of
querying the customer for information regarding the customer call, and
queuing the customer call based on the customer information.

20. In a communications network having a network call center coupled to a plurality of agent and customer switching means, each of the customer switching means comprising:
means for storing forwarding information corresponding to local telephone numbers dialed by customers;
means for receiving calls, requesting service by service agents, from customers dialing local telephone numbers;
means for retrieving the forwarding information corresponding to the local telephone numbers from the storing means; and
means for routing the calls, along with the local telephone numbers and the forwarding information, to the network call center where the calls are queued and transmitted to available ones of the service agents via the agent switching means.

21. The customer switching means of claim 20, wherein the storing means includes
means for storing forwarding information for only predetermined local telephone numbers; and
wherein the customer switching means further includes
means for determining whether the local telephone numbers correspond to the predetermined local telephone numbers.

22. The customer switching means of claim 21, wherein the retrieving means includes
means for accessing the storing means only when the local telephone numbers correspond to the predetermined local telephone numbers.

23. The customer switching means of claim 20, wherein the storing means is a local number portability database storing local routing numbers corresponding to the local telephone numbers; and
wherein the retrieving means includes
means for retrieving the local routing numbers corresponding to the local telephone numbers.

24. The customer switching means of claim 23, wherein the local routing numbers include NPA-NXX codes.

25. A method for routing service calls to service agents via a network call center coupled to customer and agent switching means, comprising the steps, executed by the customer switching means, of:
preliminarily storing in a storage unit forwarding information corresponding to local telephone numbers dialed by customers;
receiving the service calls, requesting service by the service agents, from customers dialing local telephone numbers;
retrieving the forwarding information corresponding to the local telephone numbers from the storage unit; and
routing the calls, along with the local telephone numbers and the forwarding information, to the network call center where the calls are queued and transmitted to available ones of the service agents via the agent switching means.

26. The method of claim 25, wherein the preliminarily storing step includes the substep of
preliminarily storing in the storage unit forwarding information for only predetermined local telephone numbers; and the method further comprising the step of
determining whether the local telephone numbers correspond to the predetermined local telephone numbers.

27. The method of claim 26, wherein the retrieving step includes the substep of
accessing the storage unit only when the local telephone numbers correspond to the predetermined local telephone numbers.

28. The method of claim 25, wherein the storage unit is a local number portability database storing local routing numbers corresponding to the local telephone numbers; and
wherein the retrieving step includes the substep of
retrieving the local routing numbers corresponding to the local telephone numbers from the storage unit.

29. A call servicing system comprising:
a plurality of agent switches configured to direct calls to and from service agents;
a database configured to store forwarding information corresponding to telephone numbers dialed by customers;
a plurality of customer switches configured to direct calls to and from the customers, at least one of the customer switches being connected to the database and including
means for receiving a call requesting service from one of the customers dialing a telephone number,
means for querying the database using the dialed telephone number to retrieve the forwarding information corresponding to the dialed telephone number, and
means for routing the call along with the local telephone number and the forwarding information; and
a network call center connected to the agent switches and the customer switches, and configured to route calls to the service agents via the agent switches, the network call center including
a network switch connected to the customer switches and the agent switches, and configured to receive the call from the one customer switch and to route the call to a selected service agent via one of the agent switches, and
an Automatic Call Distribution (ACD) server connected to the network switch and the agent switches, and configured to queue the call received by the network switch, to select one of the service agents who can service the call, and to control the network switch to route the call to the selected service agent via the one agent switch.

* * * * *